(12) United States Patent
Fan

(10) Patent No.: US 6,393,896 B1
(45) Date of Patent: May 28, 2002

(54) TEST DEVICE FOR LEAKAGE-PROOF OF A KEYBOARD

(75) Inventor: Chen-Ching Fan, Jongli (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 09/699,444

(22) Filed: Oct. 31, 2000

(51) Int. Cl.⁷ .................................................. G01M 3/04
(52) U.S. Cl. ........................................................ 73/40
(58) Field of Search ................................ 73/40, 41, 45, 73/45.1, 45.2, 45.3, 45.4, 49.2, 49.3

(56) References Cited

U.S. PATENT DOCUMENTS

| | | | |
|---|---|---|---|
| 2,696,107 A | * 12/1954 | Blaing-Leisk | 73/43 |
| 3,762,213 A | * 10/1973 | Nowicki | 73/45.3 |
| 3,813,923 A | * 6/1974 | Pendleton | 73/49.2 |
| 3,875,789 A | * 4/1975 | Orosy | 73/40 |
| 4,002,055 A | * 1/1977 | Kops | 73/40 |
| 4,096,736 A | * 6/1978 | Moshier | 73/40 |
| 4,188,819 A | * 2/1980 | Egee et al. | 73/52 |
| 4,291,573 A | * 9/1981 | Richter et al. | 73/37 |
| 4,356,721 A | * 11/1982 | White et al. | 73/40.7 |
| 4,495,797 A | * 1/1985 | Cassell, Jr. et al. | 73/40 |
| 5,249,454 A | * 10/1993 | Kollie et al. | 73/49.3 |
| 5,372,031 A | * 12/1994 | Harmand | 73/40 |
| 5,861,547 A | * 1/1999 | Kawai et al. | 73/49.2 |

FOREIGN PATENT DOCUMENTS

| | | | | |
|---|---|---|---|---|
| FR | EP000577454 A2 | * 6/1993 | | G01M/3/36 |
| JP | 52-42177 | * 4/1977 | | G01M/3/02 |

* cited by examiner

Primary Examiner—Hezron Williams
Assistant Examiner—C D Garber
(74) Attorney, Agent, or Firm—Rosenberg, Klein & Lee

(57) ABSTRACT

A test device for leakage-proof of a keyboard comprising a test platform having a base end provided with a test recess to hold keyboard for testing; a vacuum pump connected to the test recess by a tube to vacuum the test recess; a vacuum display connected to the vacuum pump by a tube to display the status of a vacuuming of the vacuum pump; at least a vertical driving device, mounted at the top portion of the test portion of the test platform, having an actuating rod to reciprocate; and a cover connected to the actuating rod of the vertical driving device capable of moving up and down by the actuating rod, and having the top portion provided with a hole for venting; thereby, the downward movement of the actuating rod drives the cover to cover the test recess which already holds a keyboard for testing, and the vacuum pump vacuums the vacuum recess for testing and the vacuum display indicates the status of vacuuming so as to determine leakage-proof of the keyboard within the test recess.

1 Claim, 7 Drawing Sheets

TEST DEVICE FOR LEAKAGE-PROOF OF A KEYBOARD

BACKGROUND OF THE INVENTION (a) Technical Field of the Invention

The present invention relates to a test device for leakage-proof of a keyboard, and in particular, a device which is employed to determine water leakage in keyboard by ways of a vacuuming process.

(b) Description of the Prior Art

Keyboards for computers used at home may not necessarily be waterproof. However, they are very important to computers used on marine vessels, and it is very necessary that these computer keyboards are waterproof.

FIG. 8 shows the structure of a conventional waterproof keyboard. The top face of the key board A is provided with a touch button section A1, and a waterproof rubber layer A3 is provided between the touch button section A1 and a circuit board A2 below the touch section A1. Thus, moisture or liquid entering the touch button section A1 will not leak into the circuit board A2 to affect the operational function of the keyboard A. In the process of manufacturing and assembly of the keyboard A, it is very often that the assembly of parts has deficiencies that cause leakage. In order to avoid pollution, in actual fact, the keyboards are never tested by means of a liquid but with only eye inspection. As a result, the time takes, the man power and the capital involved in the determination of leakage-proof of the keyboards are great. Besides, it is rather tired for the inspectors in the course of eye inspection process, and the quality of the keyboards produced may be affected.

Accordingly, it is an object of the present invention to provide a test device for leakage-proof of a keyboard, which can mitigate the above drawbacks.

SUMMARY OF THE INVENTION

Accordingly, it is an object of the present invention to provide a test device for leakage-proof of a keyboard, wherein by means of a vacuuming process in determination water leakage of the keyboard, the appearance of the keyboard will not be damaged and the time taken, the man power and capital used for such determination are greatly reduced.

Yet another object of the present invention is to provide a test device for leakage-proof of a keyboard, wherein by way of the vacuuming process to determine water leakage of the keyboard, the accuracy of leakage determination and the quality of inspection of the keyboard are greatly improved, mitigating the drawbacks, such as eyes tiredness and errors caused by eyes inspection process.

An aspect of the present invention is to provide a test device for leakage-proof of a keyboard comprising a test platform having a base end provided with a test recess to hold keyboard for testing; a vacuum pump connected to the test recess by a tube to vacuum the test recess; a vacuum display connected to the vacuum pump by a tube to display the status of a vacuuming of the vacuum pump; at least a vertical driving device, mounted at the top portion of the test portion of the test platform, having an actuating rod to reciprocate; and a cover connected to the actuating rod of the vertical driving device capable of moving up and down by the actuating rod, and having the top portion provided with a hole for venting; thereby, the downward movement of the actuating rod drives the cover to cover the test recess which already holds a keyboard for testing, and the vacuum pump vacuums the vacuum recess for testing and the vacuum display indicates the status of vacuuming so as to determine leakage-proof of the keyboard within the test recess.

Other object and advantages of the present invention will become more apparent from the following description taken in conjunction with the accompanying drawing.

DETAILED DESCRIPTION OF THE PREFERRED EMBODIMENT

Figure 1:
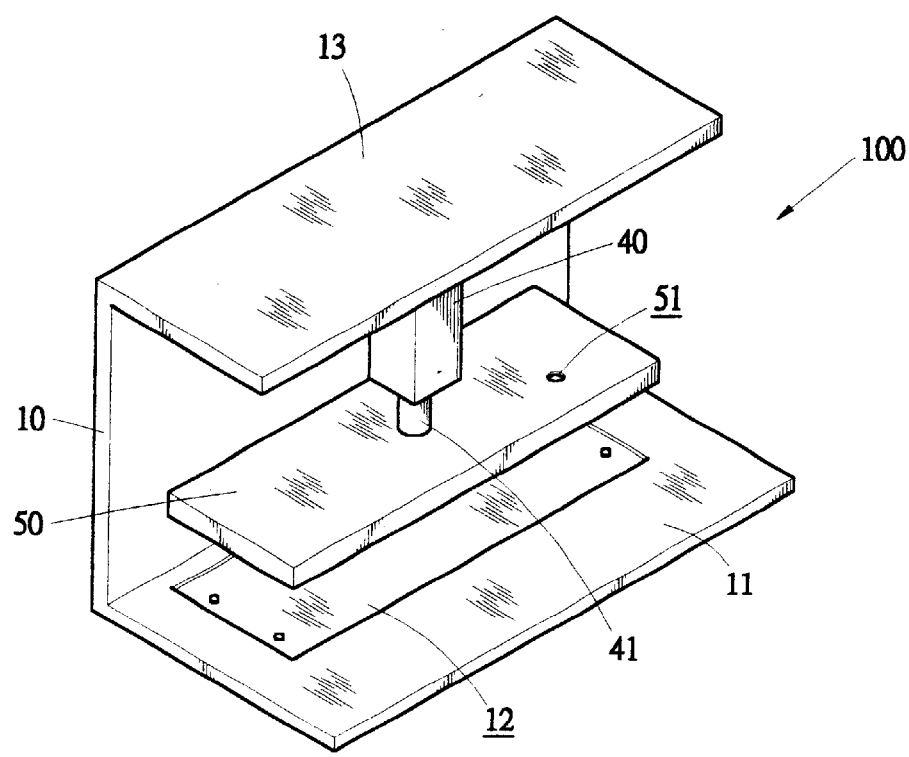
FIG. 1 is a perspective view of a test device for leakage-proof of a keyboard in accordance with the present invention.
Figure 2:
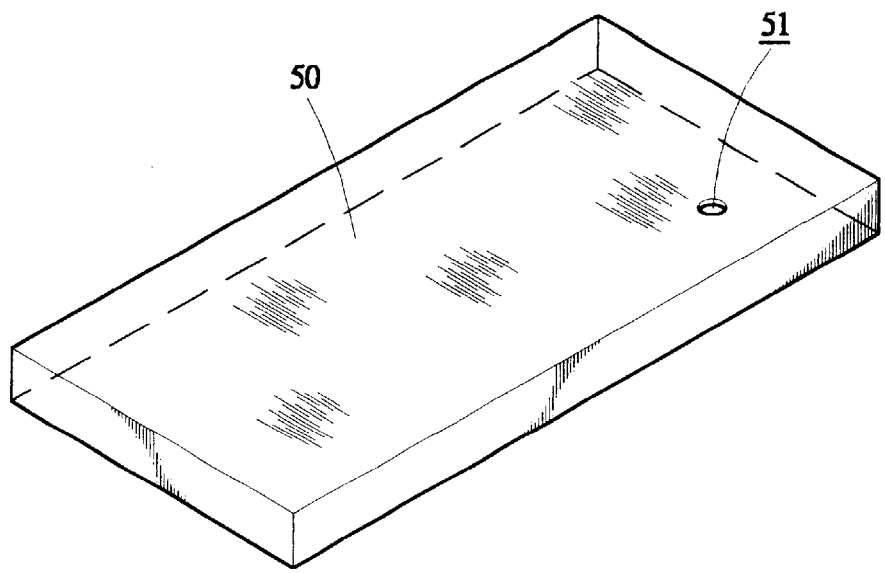
FIG. 2 is a perspective view of the cover of a test device for leakage-proof of a keyboard of the present invention.
Figure 3:
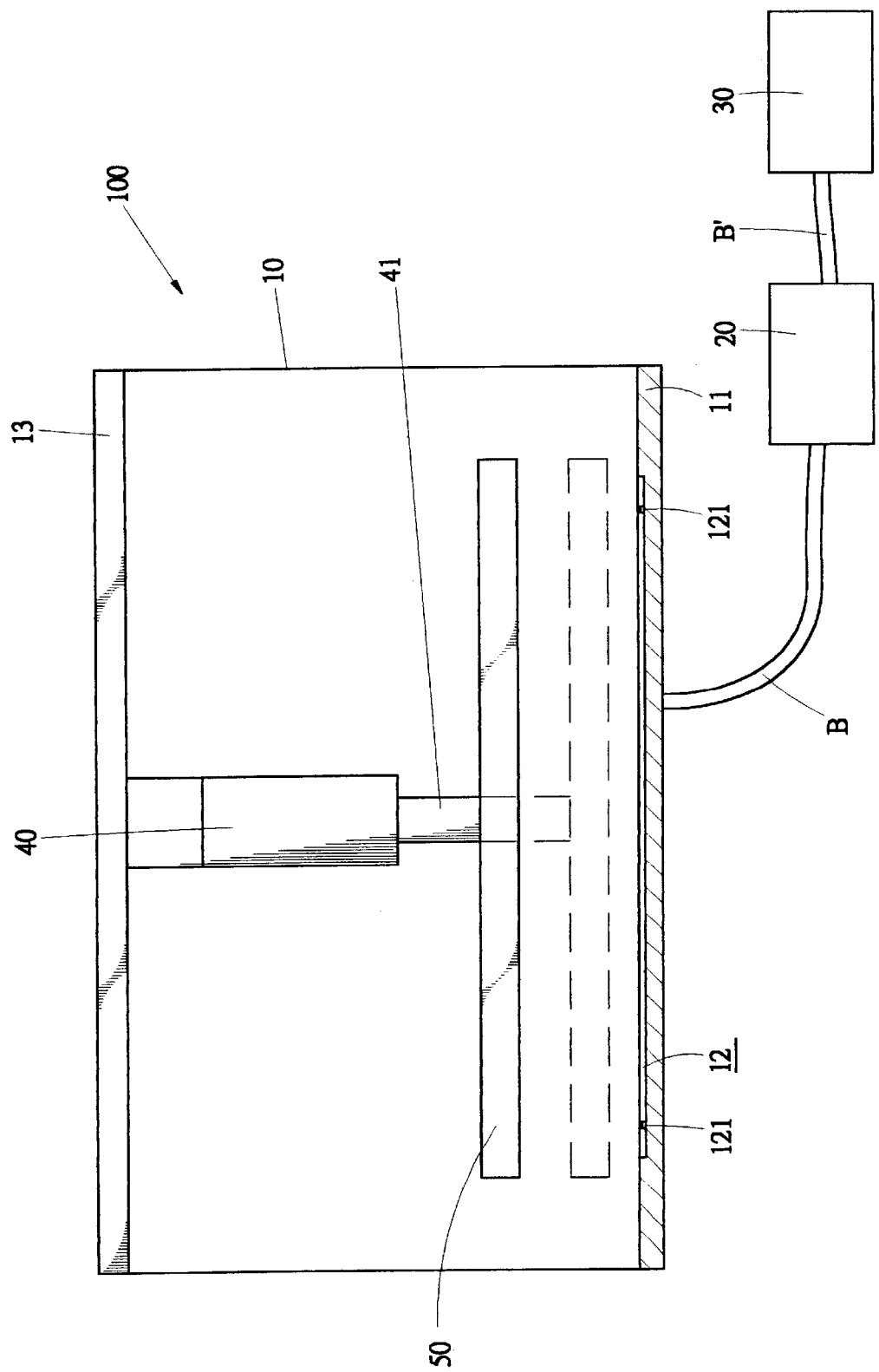
FIG. 3 is a front view, showing the connection of the vacuum pump to the vacuum display at the vacuum recess of the present invention.

Referring to FIGS. 1 to 4, there is shown a test device for leakage of a keyboard in accordance with the present invention. The device is denoted by reference number 100 and comprises a test platform 10 having a "C-shaped" structure (but it is not restricted to this shape) having a base board 11, at the bottom section of the platform 10, being provided with at least a test recess 12 (of any shape) to hold a keyboard. In accordance with the present invention, the test recess 12 is provided with a plurality of protrusions 121 for supporting and positioning a keyboard C (refer to for FIG. 5) for leakage-proof determination. The bottom section of the test recess 12 is connected externally by a tube B to a vacuum pump 20 so that the pump 20 can vacuum the test recess 12. Another tube B' connects the vacuum pump 20 to a vacuum display 30 to display the status of vacuuming process of the vacuum pump 20. The shape of the vacuum display 30 is not limited to the present invention, and it can be either a digital or a mechanical display.

Figure 4:
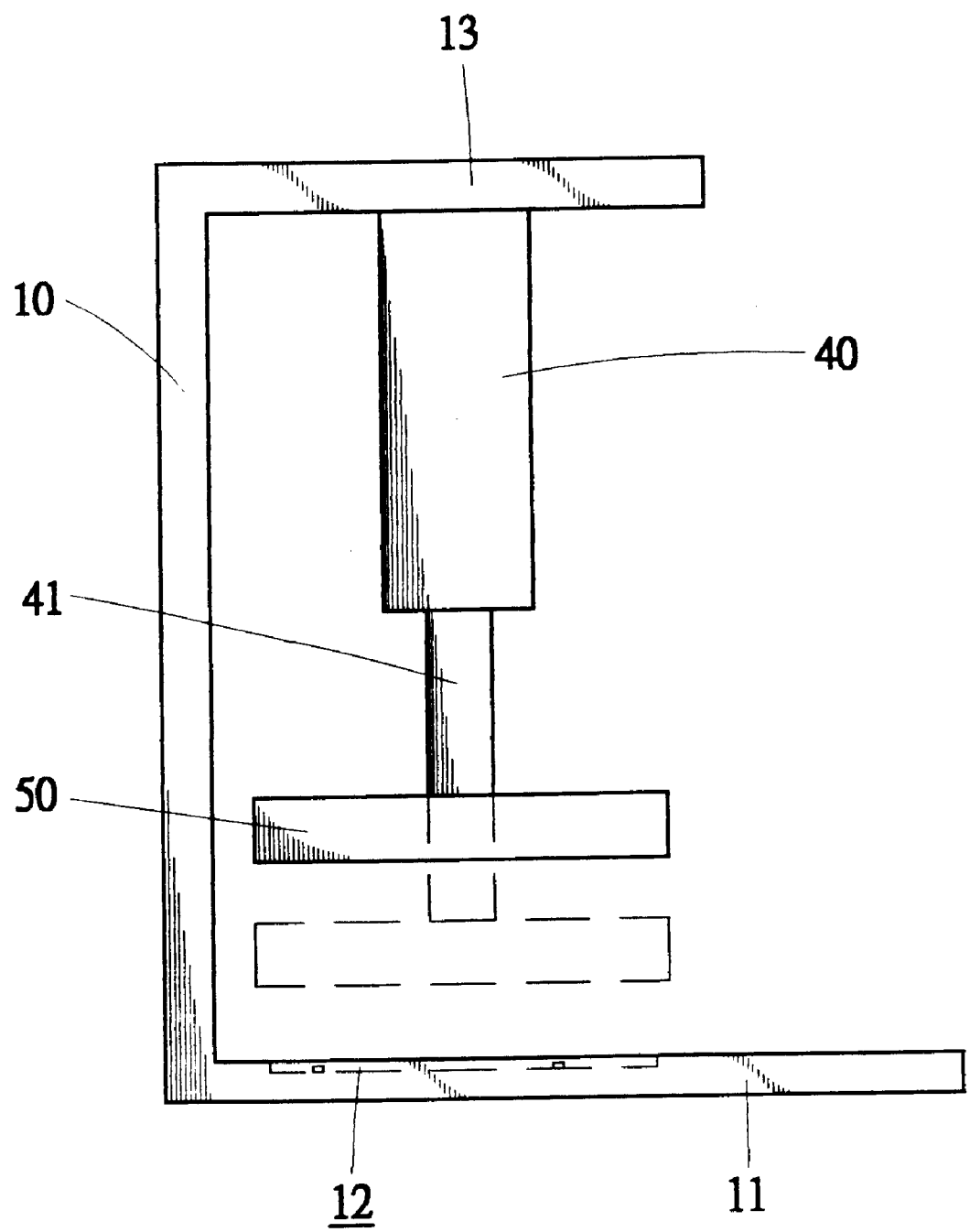
FIG. 4 is an elevational view, showing the up and down vertical movement of the cover driven by the vertical driving device of the present invention.

In accordance with the present invention, a top board 13 at the top section of the test platform 10 is mounted with a vertical driving device 40, which can be either a pneumatic cylinder or an electromagnetic cylinder having up and down vertically retraction control elements. An actuating rod 41 is provided at the vertical driving device 40, and a cover 50 is connected to the actuating rod 41. The top of the cover 50 is provided with at least a hole 51 for air venting purpose for the cover 50. The cover 50 is driven vertically downward by means of the vertical driving device 40 (as shown in FIG. 4) and the cover 50 covers the entire test recess 12, such that when the keyboard C for testing is placed within the test recess 12, the hole 51 at the cover 50 is the only air communication hole with the external environment.

Figure 5:
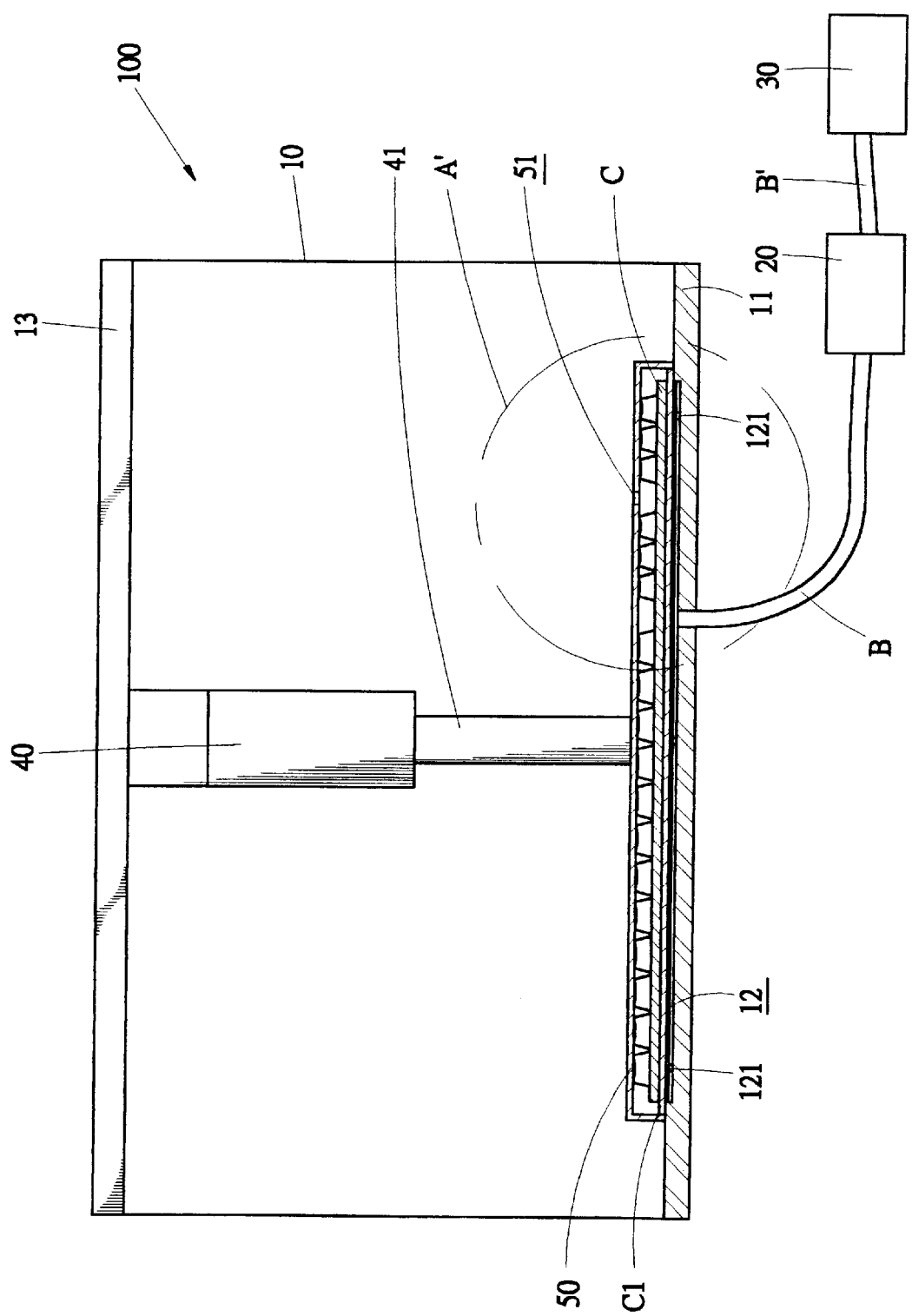
FIG. 5 is a front view showing the vacuuming status of the keyboard located at the test recess in accordance with the present invention.
Figure 6:
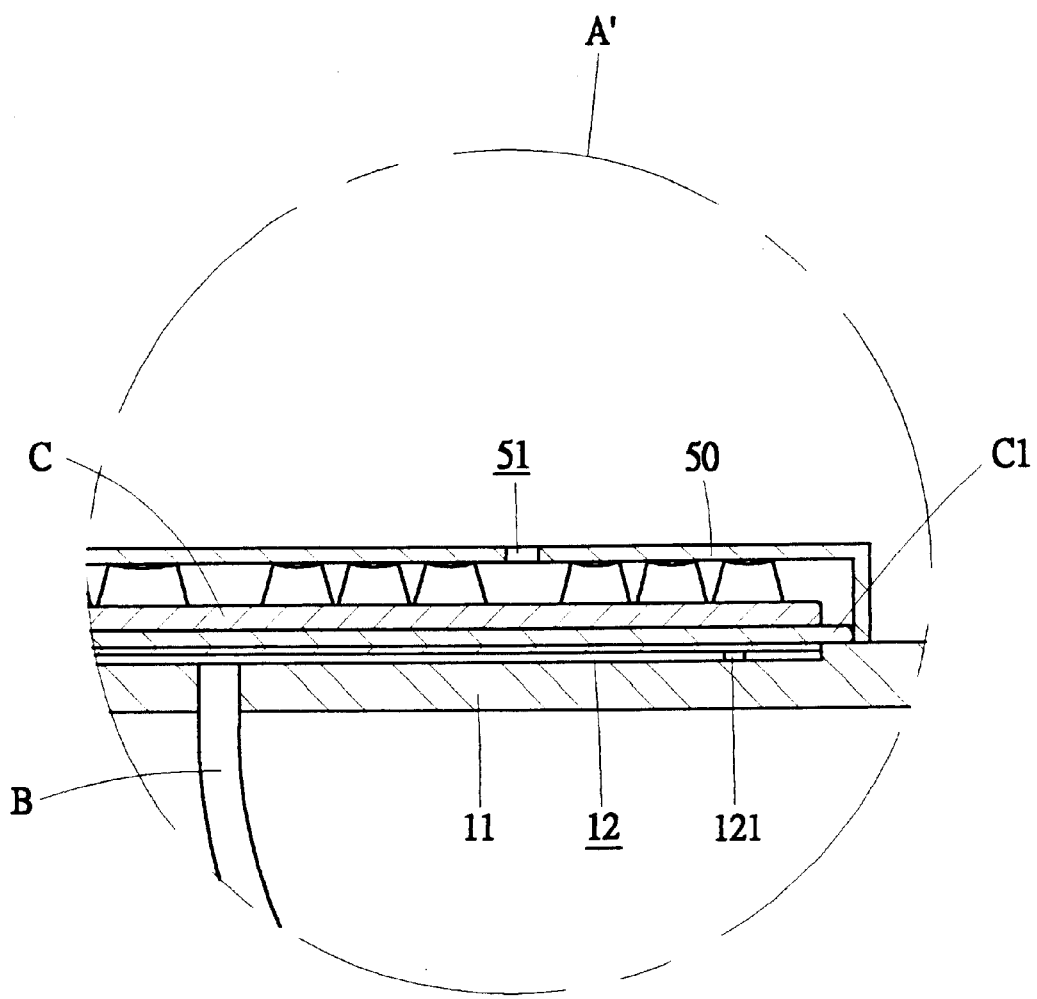
FIG. 6 is an enlarged view of part A of FIG. 5 of the present invention.

Referring to FIGS. 5 and 6, and as shown in FIGS. 1 to 4, when testing the leakage-proof of the keyboard C, the keyboard C is placed within the test recess 12 and is positioned and supported by means of the protrusions 121 at the test recess 12. The vertical driving device 40 drives the cover 50 downward to cover the entire test recess 12 and the keyboard C for testing. By means of the operation of the vacuum pump 20, the test recess 12 is proceeded to a vacuuming process. At this instance, the air at the test recess 12 will be extracted to form vacuum, and the entire keyboard C will be sucked downward. By means of the support of the protrusions 121, the keyboard C for testing will not bend or be distorted. In addition, a water-resistance layer C1 of the keyboard C (under normal waterproof condition) will isolate the air at the top of the keyboard C and the cover 50 from entering the test recess 12, and the bottom section of the test recess 12 will become a true vacuum, and the vacuum display 30 shows at the state of normal vacuum. That is, this indicates that the leakage-proof function of the keyboard C is normal.

Figure 7:
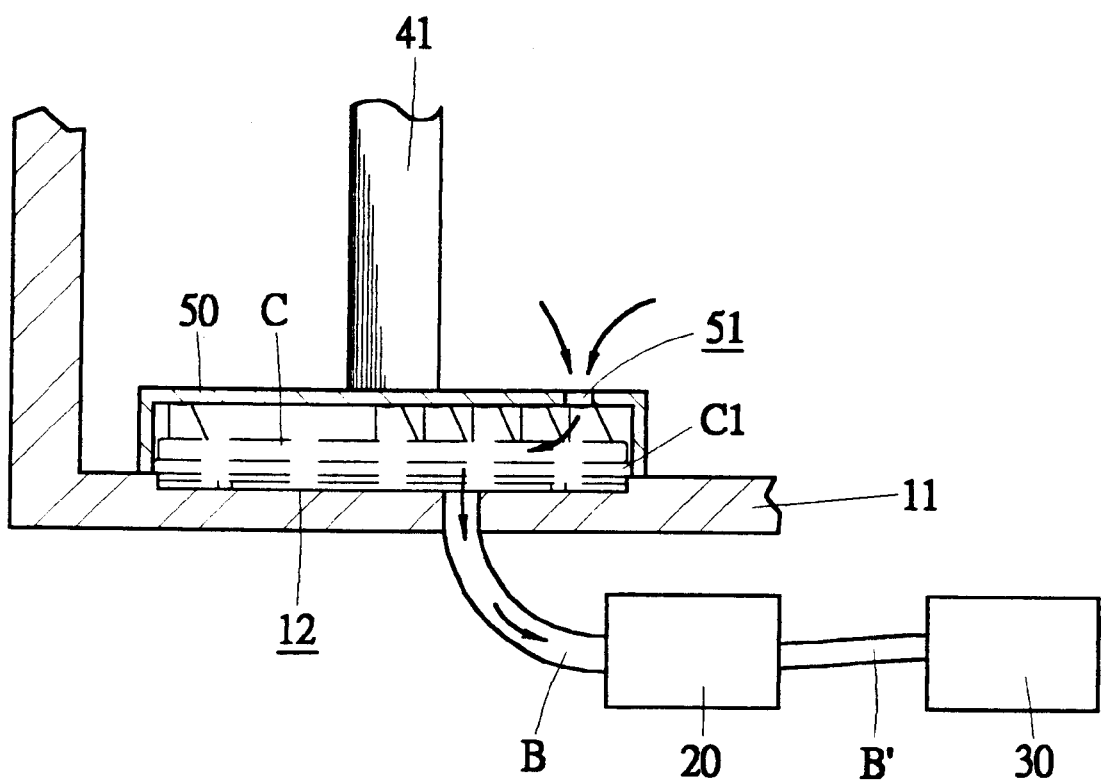
FIG. 7 is an elevational view, showing the unqualified status of the test keyboard located at the test recess in accordance with the present invention.
Figure 8:
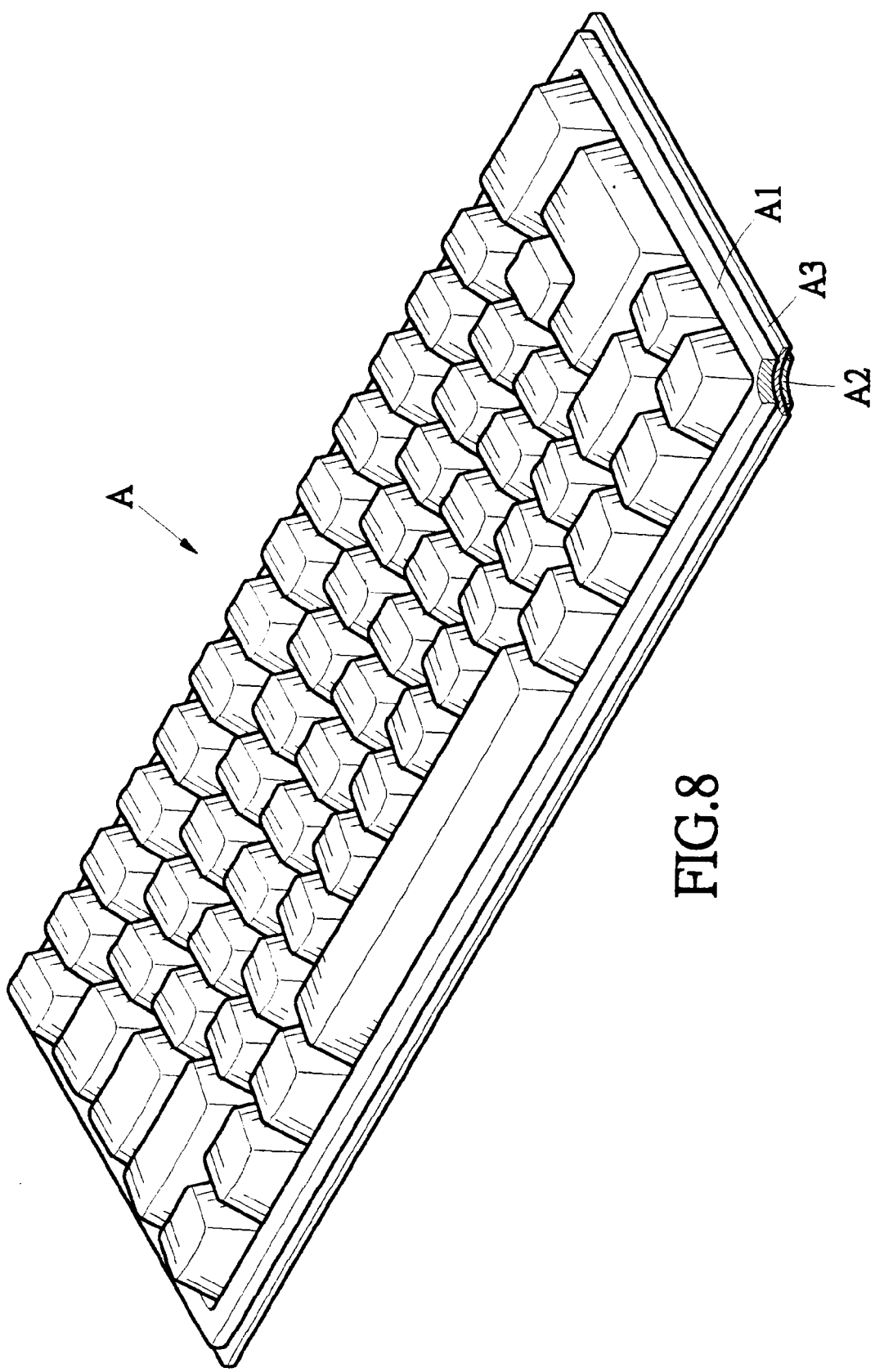
FIG. 8 is a perspective view of a conventional waterproof keyboard.

Referring to FIG. 7, there is shown an unqualified waterproof keyboard C tested by the test device 100 of the present invention. When the vacuum pump 20 vacuums the test recess 12, if the waterproof layer C1 of the keyboard C has a leakage or slit (not shown), and no matter how small is the leakage or slit, the air above the keyboard C or at the cover 50 will reach the test recess 12. When the air within the cover 50 has been extracted, a continuous supply of air via the hole 51 will enter the cover 50 (as shown by the arrow in FIG. 7). At this instance, no matter how the vacuum pump 20 is operated, the test recess 12 can never become vacuum. In other words, the vacuum pump 20 will not vacuum the test recess 12. At this instance, the vacuum display 30 will indicate no vacuum being formed. By means of a clear and precise test results, the operator can easily determine the water leakage of the keyboard C and to discard the unqualified products. In view of the above description, the man power, time and capital used in the determination of leakage-proof of the keyboard are greatly reduced.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

What is claimed is:

1. A leakage test device for keyboards, comprising:

a) a test platform having a base, said base having a test recess formed therein;

b) a keyboard overlaying said recess in said base and forming a closure therefor;

c) a vacuum pump having a tube coupled in fluid communication with said test recess for evacuation thereof;

d) a vacuum display having a tube coupled in fluid communication with said vacuum pump for displaying a vacuum level thereof;

e) a vertical driving device coupled to an upper portion of said test platform, said vertical driving device having a reciprocateable actuating rod extending vertically therefrom; and, f) a cover having a cavity formed therein and being connected to said actuating rod to be displaceable therewith, said cover being displaced to overlay said test recess in said base and receive said keyboard in said cavity thereof, said cover having a vent hole formed therethrough in open communication with an ambient atmosphere external to said cover, wherein leakage of said keyboard is detected by leakage of the ambient atmosphere into said recess to thereby diminish a vacuum level therein and an indication thereof being provided by said vacuum display.

* * * * *